United States Patent [19]

Burgdorf

[11] Patent Number: 5,249,935
[45] Date of Patent: Oct. 5, 1993

[54] PISTON PUMP

[75] Inventor: Jochen Burgdorf, Offenbach-Rumpenheim, Fed. Rep. of Germany

[73] Assignee: Alfred Teves GmbH, Frankfurt am Main, Fed. Rep. of Germany

[21] Appl. No.: 855,637

[22] PCT Filed: Jul. 9, 1991

[86] PCT No.: PCT/EP91/01277
§ 371 Date: May 4, 1992
§ 102(e) Date: May 4, 1992

[87] PCT Pub. No.: WO92/04216
PCT Pub. Date: Mar. 19, 1992

[30] Foreign Application Priority Data

Sep. 3, 1990 [DE] Fed. Rep. of Germany ....... 4027848

[51] Int. Cl.$^5$ .............................................. F04B 21/00
[52] U.S. Cl. ........................................... 417/415; 92/60
[58] Field of Search ............................. 417/415; 92/60

[56] References Cited

U.S. PATENT DOCUMENTS 3,168,045 2/1965 Sebastiani ............................... 92/60

Primary Examiner—Richard A. Bertsch
Assistant Examiner—David W. Scheuermann
Attorney, Agent, or Firm—Robert P. Seitter; J. Gordon Lewis

[57] ABSTRACT

A piston pump is described which adapts the output flow to the supply flow which is intended in particular for use in a hydraulic brake slip control apparatus, the pump having a pump housing (2) with working chambers (9, 10) which are connectible to supply lines via an inlet valve (5) and an outlet valve (6). Working pistons (15) defining in part the working chambers are cyclically movable to increase and decrease the volume of the working chambers (9, 10) and are guided in cylinder bores (11, 12) and driven by a an eccentric (14) in order to perform stroke movements. The cylinder bores (11, 12) also receive charging pistons (18) which also define in part the working chambers (9, 10) and which are movable to decrease the volume of the working chambers (9, 10) by way of compression springs (20) supported on the pump housing (2) and which, via a pin (21), can be pressed against the working pistons (15). The charging pistons (18) are limited in their movement out of the working chambers (9, 10) by stops on the pump housing (2). The charging pistons (18) are moved inwardly, overcoming the frictional grip of a seal (22) to reduce the working chamber volume and thus the flow rate of the piston pump in order to avoid cavitation, in the event that the quantity of pressure fluid delivered via the inlet valves (5) does not suffice to preserve a predetermined suction pressure in the working chambers (9, 10).

10 Claims, 1 Drawing Sheet

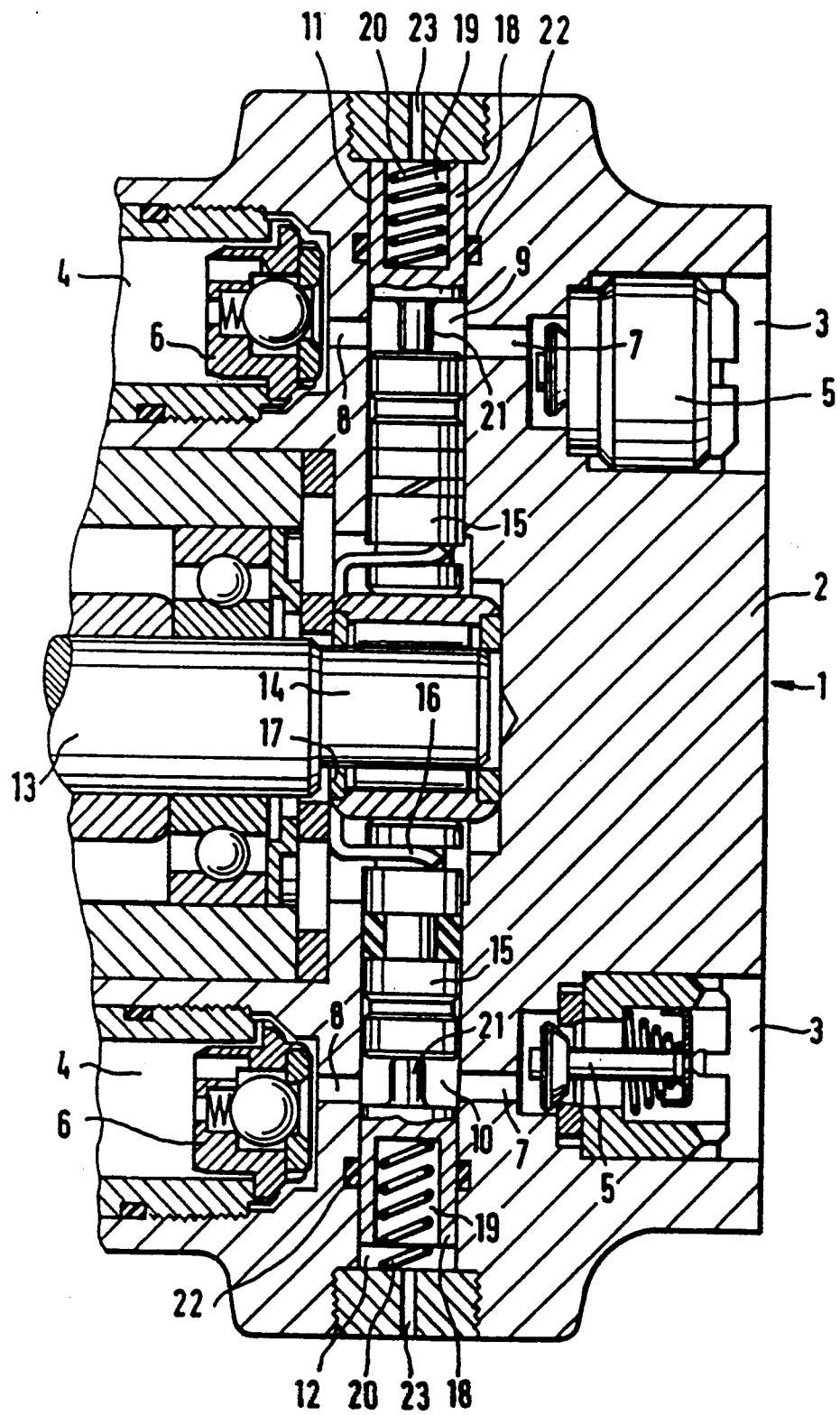

PISTON PUMP

BACKGROUND OF THE INVENTION

The present invention relates to a piston pump, more particularly for use in a hydraulic brake slip control apparatus, comprising a pump housing with at least one working chamber which is connectible to supply lines via an inlet valve and an output valve, and comprising a working piston movable into the working chamber and drivable to perform stroke movements.

A piston pump of the mentioned type is known from German published patent application 38 08 901. In various cases control of the flow rate supplied to the pump is performed on the suction side. It may occur as a result that the pressure fluid supply on the suction side is less that the delivery rate of the pump so that cavitation in the working chamber of the pump is encountered and, consequently, there is a risk of air being sucked in through the piston clearance.

It is an object of the present invention to provide a piston pump of the type referred to, the flow rate of which is dependent on the pressure fluid supply on the suction side.

SUMMARY OF THE INVENTION

This object is achieved according to the present invention by a charging piston which confines the working chamber and is freely movable between two end positions defined by stops, the stroke volume of which corresponds to the stroke volume of the working piston. The charging piston of the piston pump according to this invention compensates for the lack of fluid supply by its stroke movement during the suction stroke of the working piston so that merely that quantity of pressure fluid is sucked in which propagates via the suction valve into the working chamber. The quantity of pressure fluid sucked in during a suction stroke of the working piston may thus range between zero and the stroke volume of the working piston. Cavitation in the working chamber is avoided this way. Depending on the resistance to a change in position of the charging piston, at most a small pressure below atmospheric pressure will occur in the working chamber, however, without there being the risk of air intake.

When pressure below atmospheric pressure in the working chamber is to be avoided during the suction stroke, the charging piston can be movable into the working chamber by resilient means supported on the pump housing according to another feature of this invention. Owing to the force of the resilient means, the resistance to a change in position of the charging piston can be made up for and, in addition, a suction pressure can be determined which must prevail in the suction-side supply line in order to permit the piston pump to receive and deliver pressure fluid.

For employing the piston pump in a brake slip control apparatus, the charging piston is adapted to be retained in its retracted end position on the stop of the pump housing by a pressure in the working chamber of roughly 1 to 2 bar. In this design the pressure in the brake system can be decreased sufficiently, and the risk of air intake after de-activation is reliably avoided.

It can be provided in a favorable improvement of this invention that the operating cross-sections of charging piston and working piston are of equal size and that the working piston forms the stop for an end position of the charging piston. This accomplishes a simple structure, and the charging piston can be moved into its retracted end position by mechanical contact with the working piston, the reliability being enhanced thereby.

Further, it is expedient that the charging piston is sealed in relation to the cylinder bore by a ring seal. The resistance to a change in position of the charging piston can be effectively increased by means of the ring seal.

Simplification of the piston pump can be achieved further in that the working piston and the charging piston are accommodated in one common cylinder bore. It is suitable when the charging piston and/or the working piston includes on its end face close to the working chamber, an extension, the peripheral surface of which has such a distance from the wall of the cylinder bore that the flow route to the inlet valve and to the outlet valve remains free in all piston positions.

The resilient means according to this invention can be a compression spring which is arranged in an axial bore in the charging piston The present invention will be described in more detail hereinbelow by way of an embodiment illustrated in the Figure.

DESCRIPTION OF THE DRAWING

The Figure shows a cross-section through a radial piston pump according to the invention with a positively guided piston.

DETAILED DESCRIPTION

The illustrated radial piston pump 1 comprises a pump housing 2 with inlet bores 3 and outlet bores 4. Inlet valves 5 are arranged in the inlet bore 3, while outlet valves 6 are arranged in the outlet bores 4. Leading from the inlet valves 5 are inlet ports 7 and leading from the outlet valves 6 are outlet ports 8 to the working chambers 9, 10 which each are defined by a section of a cylinder bore 11, 12, as well as by one face of an associated working piston 15. The cylinder bores 11, 12 are arranged radially relative to a rotatably drivable shaft 13 with an eccentric 14, and each thereof comprises a working piston 15 which is pressed by a spring washer 16 against a roller bearing 17 placed on the eccentric 14. Rotation of the eccentric 14 causes the working pistons 15 to perform a stroke movement, to cyclically increase and decrease the volume of the working chambers 9, 10.

Radially outwardly, the working chambers 9, 10 are defined in part by charging pistons 18 which likewise are of equal diameter with the working piston 15 movably mounted in the cylinder bores 11, 12 to increase or decrease the volume of the working chambers 9, 10. The charging piston 18 each also contain bores 19 accommodating compression springs 20 that engage the end of the pump housing 2.

Projecting from each of the charging pistons 18 is a cylindrical pin extension 21 which is of smaller diameter compared to the cylinder bore 11 and 12, respectively, the cylindrical pin extension 21 each extending into the adjacent working chamber 9 and 10, respectively, and engage the working pistons 15, respectively, under the action of the compression springs 20.

The charging pistons 18 are sealed in relation to the cylinder bore 11, and 12, respectively, by a frictionally gripping ring seal 22. The radially outward ends of the two cylinder bores 11, 12 are in communication with the atmosphere by venting means comprising a bore 23 so that the opposite face of the charging pistons 18 are subject to atmospheric pressure.

The resistance to a change in position of the charging pistons 18 caused by friction and the force of the compression springs 20 are adapted to one another such that a pressure of roughly 3 to 5 bar is necessary in the working chambers 9, 10 in order to move the charging pistons 18 radially outwardly into a first end position where they abut on the pump housing 2, defining a first stop. Due to the reversal of direction during the radially inwardly directed movement of the charging pistons 18, a pressure of 1 to 2 bar in the working chambers 9, 10 will suffice to keep the charging pistons 18 in their radially outward end position. The full rate determined by the stroke volume of the working pistons 15 will hence be attained as long as the pressure during the suction stroke of the working pistons 15 does not fall short of the mentioned value. This happens when a pressure of at least 3 bar prevails on the inlet bores 3 and the quantity of pressure fluid supplied is sufficient to maintain this pressure during the suction stroke.

Once the quantity of pressure fluid supplied to the pump becomes smaller than the flow rate, the pressure will decrease on opening of the inlet valves 5 below the pressure required to maintain the position of the charging pistons 18. The charging pistons 18 will then be moved by the compression springs 20 towards the working pistons 15 to decrease the volume of the working chambers 9, 10 as a result, to thereby compensate for the insufficient pressure fluid supply.

If a partial quantity of pressure fluid was still delivered during the suction phase, the charging pistons 18 will be kept spaced from the working pistons by way of the pressure-fluid cushion prevailing in the working chambers 9, 10 after the inlet valves 5 are closed and, during the subsequent pressure stroke, are urged by this cushion to return to their radially outward end position. As soon as the charging pistons 18 abut on the pump housing 2, the pressure can rise further in the working chambers 9, 10, and the partial quantity sucked in can displace through the outlet valves 6.

When the pressure fluid supply on the inlet bores 3 ceases, the charging pistons 18 will move pin extensions 21 into abutment with the working pistons 15, comprising a second stop, setting a second end position of the charging piston 18 and, due to the mechanical contact, are moved to and fro together with the working pistons 15. A pressure fluid cushion is maintained in the working chambers 9, 10 hereby, so that cavitation and the sucking in of air are not allowed to occur. The maximum displaced volume of the working piston 15 and that of the charging piston 18 are equal to produce this result.

I claim:

1. A piston pump comprising a pump housing, at least one working chamber defined in said pump housing, an inlet valve controlling inlet fluid flow into said working chamber and an outlet valve controlling outlet fluid flow from said working chamber, a working piston mounted in said housing to have one face defining in part said working chamber, said working piston cyclically movable in one direction to increase the volume of said working chamber and draw fluid into said working chamber through said inlet valve and in the other direction to force a displaced volume of fluid out of said working chamber through said outlet valve, drive means driving said piston to perform said cyclical movements, a charging piston mounted in an axial bore in said pump housing, one face defining in part said working chamber, said charging piston movable outwardly to a retracted end position forced against a stop by a first predetermined minimum pressure level generated in said working chamber as said working piston moves completely in said other direction to displace fluid from said working chamber;

positioning means holding said charging piston in said retracted end position against said stop as long as the pressure in said working chamber is above a second predetermined minimum pressure substantially below said first predetermined minimum pressure level, and means moving said charging piston from said retracted end position towards said working piston whenever the pressure in said working chamber declines below said second predetermined minimium pressure level as said working piston moves in said one direction.

2. A piston pump as claimed in claim 1 wherein the diameter of said charging piston and of said working piston are equal, and in that said working piston and charging piston come into contact with each other to comprise a stop at an advanced end position of said charging piston.

3. A piston pump as claimed in claim 1, wherein said working piston and said carrying piston are both slidably mounted in a common cylinder bore.

4. A piston pump as claimed in claim 3, wherein one of said charging piston or said working piston includes on said face defining in part said working chamber as extension having a peripheral surface substantially within a wall of said cylinder bore so that the flow route to said inlet valve and said outlet valve remains clear in all piston positions.

5. A piston pump as claimed in claim 1, wherein said means moving said charging piston towards said working piston upon a decline in pressure in said working chamber below said second predetermined minimum pressure level comprises resilient means interposed between said charging piston and said pump housing urging said charging piston away from said retracted end position, said positioning means holding said charging piston against the urging of said resilient means until said working chamber pressure declines below said second predetermined minimum pressure level.

6. A piston pump as claimed in claim 5 wherein said resilient means comprises a compression spring accommodated in an axial bore in said charging piston.

7. A piston pump as claimed in claim 5 wherein said positioning means includes means creating a friction force on said charging piston sufficient so that said charging piston is held in said retracted end position notwithstanding the urging of said resilient means by a pressure in the working chamber of approximately 1 to 2 bar.

8. A piston pump as claimed in claim 7, wherein said charging piston is sealed in relation to said cylinder bore by a ring seal comprising said means creating a friction force.

9. A piston pump comprising:
a pump housing;
a bore in said pump housing defining in part a working chamber;
an inlet port in said pump housing entering into said working chamber;
an inlet valve opening upon development of a predetermined pressure thereacross to allow fluid flow into said inlet port;

an outlet port in said pump housing entering into said working chamber;

an outlet valve opening upon development of a predetermined pressure thereacross to allow outflow from said working chamber;

a working piston slidably mounted in said bore and having an end face defining in part said working chamber so as to cause an increase or decrease in the volume of said working chamber upon movement towards and away from said working chamber;

drive means for cyclically moving said working piston in said bore towards and away from said working chamber;

a charging piston movably mounted in said pump housing and having an end face defining in part said working chamber; venting causing an opposite end face to be subject to atmospheric pressure;

gripping means creating a predetermined force level of resistance to movement of said charging piston towards said working chamber, whereby upon movement of said charging piston towards said working chamber, the volume of fluid drawn into said working chamber is reduced.

10. The piston pump according to claim 9, further including resilient means creating a predetermined force urging said charging piston towards said working chamber, said resilient force less than said force created by said gripping means.

* * * * *